United States Patent
Kalev et al.

(10) Patent No.: US 7,633,172 B2
(45) Date of Patent: Dec. 15, 2009

(54) THREE PLUS THREE PHASE FLYWHEEL POWER SUPPLY

(75) Inventors: Claude Michael Kalev, Newbury Park, CA (US); Heath F. Hofmann, State College, PA (US)

(73) Assignee: Pentadyne Power Corporation, Chatsworth, CA (US)

(*) Notice: Subject to any disclaimer, the term of this patent is extended or adjusted under 35 U.S.C. 154(b) by 0 days.

(21) Appl. No.: 12/371,453

(22) Filed: Feb. 13, 2009

(65) Prior Publication Data

US 2009/0152874 A1 Jun. 18, 2009

Related U.S. Application Data

(63) Continuation of application No. 11/624,206, filed on Jan. 17, 2007, now abandoned.

(51) Int. Cl.
*H02K 7/09* (2006.01)
(52) U.S. Cl. .................................................. 290/1 R
(58) Field of Classification Search .................. 290/1 R
See application file for complete search history.

(56) References Cited

U.S. PATENT DOCUMENTS

| | | | | | |
|---|---|---|---|---|---|
| 4,406,950 | A | * | 9/1983 | Roesel, Jr. ................... 290/4 C |
| 4,444,444 | A | * | 4/1984 | Benedetti et al. ............ 310/90.5 |
| 4,511,190 | A | * | 4/1985 | Caye et al. .................. 310/90.5 |
| 4,612,494 | A | * | 9/1986 | Kawamura ...................... 322/4 |
| 5,703,423 | A | * | 12/1997 | Fukao et al. ................ 310/90.5 |
| 5,708,312 | A | * | 1/1998 | Rosen et al. .................... 310/90 |
| 5,864,303 | A | * | 1/1999 | Rosen et al. ............ 340/870.37 |
| 6,819,012 | B1 | * | 11/2004 | Gabrys .......................... 307/68 |
| 6,897,587 | B1 | * | 5/2005 | McMullen et al. ......... 310/90.5 |
| 7,109,622 | B2 | * | 9/2006 | Khalizadeh ................ 310/90.5 |
| 7,187,087 | B2 | * | 3/2007 | Khalizadeh ................. 290/1 R |
| 2009/0134705 | A1 | * | 5/2009 | Kalev ........................... 307/68 |

FOREIGN PATENT DOCUMENTS

JP 2005240963 A * 9/2005

OTHER PUBLICATIONS

Hofmann et al., High-Speed Synchronous Reluctance Machine With Minimized Rotor Losses, IEEE Trans. on Industry Applications, vol. 36, No. 2, Mar./Apr. 2000, pp. 531-539.

* cited by examiner

*Primary Examiner*—Joseph Waks
(74) *Attorney, Agent, or Firm*—Ocean Law; Paul D. Chancellor

(57) ABSTRACT

A flywheel power supply includes a motor-generator having a polyphase stator.

9 Claims, 5 Drawing Sheets

US 7,633,172 B2

THREE PLUS THREE PHASE FLYWHEEL POWER SUPPLY

PRIORITY CLAIM AND INCORPORATION BY REFERENCE

Priority Claim

This application is a continuation of U.S. application Ser. No. 11/624,206 filed Jan. 17, 2007 now abandoned which claims priority from U.S. application Ser. No. 11/251,394 filed Oct. 14, 2005 now U.S. Pat. No. 7,187,087, which claims priority form U.S. Div. application Ser. No. 10/863,868 filed Jun. 7, 2004 now U.S. Pat. No. 7,109,622, which claims priority form U.S. Prov. App. No. 60/476,226 filed Jun. 6, 2003.

Incorporation By Reference

This application incorporates by reference U.S. Pat. No. 7,187,087 to Kalev (formerly Khalizadeh) issued Mar. 6, 2007, U.S. Pat. No. 7,109,622 to Kalev (formerly Khalizadeh) issued Sep. 19, 2006, U.S. Pat. No. 7,078,876 to Hofmann et al. issued Jul. 18, 2006, U.S. Pat. No. 5,998,899 to Rosen et al. issued Dec. 7, 1999 and U.S. Pat. No. 5,708,312 to Rosen et al. issued Jan. 13, 1998.

BACKGROUND OF THE INVENTION

1. Field Of Invention

The present invention relates to the mechanical arts and energy conversion and storage systems. In particular, the present invention relates to flywheel electric power supply systems having high-speed rotating assemblies.

2. Description Of The Related Art

Flywheel energy storage systems have provided a mechanical energy storage solution for hundreds of years as evidenced by the potter's wheel. Such systems differ in many respects from modern-day flywheel energy storage solutions. More recent design imperatives including high power density and electric power outputs have led to lightweight, high-speed flywheels operating in evacuated chambers and driving a similarly high-speed electric generator.

SUMMARY OF THE INVENTION

Now, in accordance with the invention, there has been found an assembly including a flywheel mass for exchanging mechanical power with the rotor of a motor-generator.

BRIEF DESCRIPTION OF THE DRAWINGS

The present invention is described with reference to the accompanying drawings that illustrate the invention and, together with the description, explain the principles of the invention enabling a person skilled in the relevant art to make and use the invention.

DESCRIPTION OF THE PREFERRED EMBODIMENTS

General Description

Figure 1A:
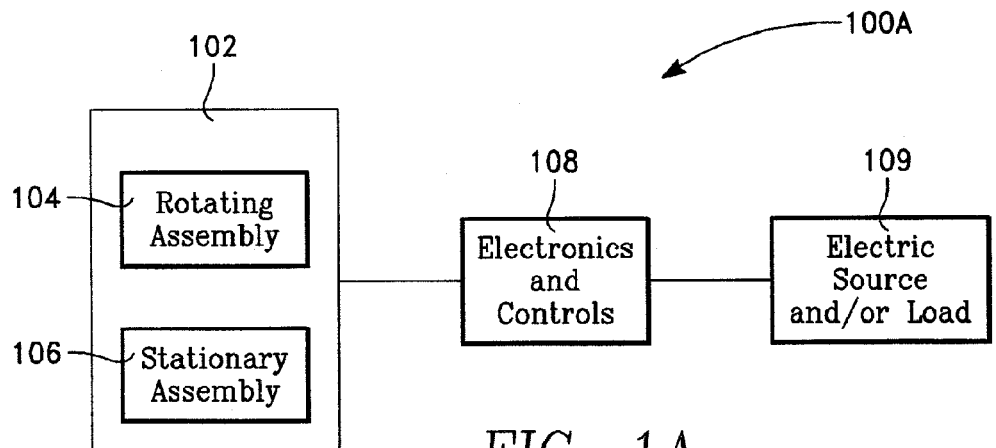
FIG. 1A is a block diagram of a flywheel power supply in accordance with the present invention.

FIG. 1A shows a flywheel power supply in accordance with the present invention 100A. An evacuated containment 102 encloses a rotating assembly 104 and an associated stationary assembly 106. An electronics and controls package 108 exchanges electric power with each of the stationary assembly 106 and an electrical source and/or load 109.

Figure 1B:
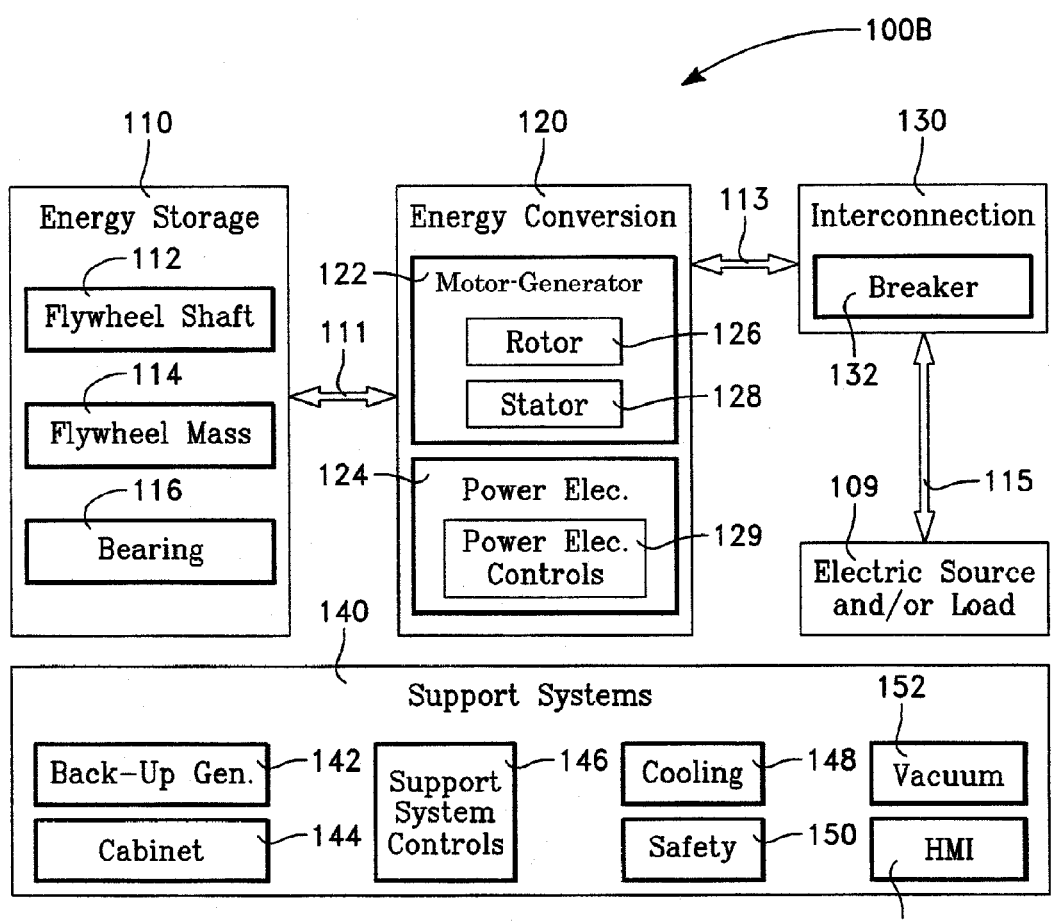
FIG. 1B is a block diagram showing systems of various embodiments of the flywheel power supply of FIG. 1A.

FIG. 1B shows systems of a flywheel power supply 100 B. An energy conversion system 120 exchanges energy 111 with an energy storage system 110 and exchanges energy 113, 115 with an electric source and/or load 109 via an optional interconnection system 130. In various embodiments, one or more support systems 140 provide services to one or more of the energy storage, energy conversion and interconnection systems.

Included in the energy storage system 110 is a flywheel mass 114, a shaft and/or bearing interface 112, and at least one bearing supporting the mass 116. Energy in the form of kinetic energy is stored in rotating flywheel parts including the flywheel mass.

Energy conversion takes place in the energy conversion system 120 when an electric motor-generator 122 exchanges mechanical power bi-directionally with the shaft to produce or consume electric power that is processed by a power electronics package 124 controlled by power electronics controls 129. An electric source and/or load 109 exchanges power 113, 115 with a power electronics package 124 and in some embodiments the electric power flows through a breaker 132 of the optional interconnection system 130 (as shown).

Within the energy storage system are the flywheel shaft 112 and flywheel mass 114 and within the energy conversion system is a rotor of the motor generator 122; these parts are included in a rotating assembly 104. In various embodiments, the flywheel mass exchanges mechanical energy with the motor-generator.

In some embodiments the flywheel mass 114 and motor-generator rotor 126 are indirectly coupled. And, in some embodiments the flywheel mass and motor-generator are directly coupled. In an embodiment, the flywheel mass is coupled to, and constrained to rotate in synchrony with, the rotor. Related to the rotating assembly is a stationary assembly 106 that includes the motor-generator stator of the energy conversion system 128.

In various embodiments, the flywheel power supply includes one or more support systems 140. Among these support systems are a back-up generator for providing back-up electric power 142, a cabinet for housing parts of the flywheel power supply 144, support systems controls 146 for controlling among other things electromagnetic bearings, a cooling system 148 for collecting and rejecting heat produced by the flywheel power supply, one or more safety systems 150 including a flywheel mass safety containment system, a vacuum system 152 for evacuating a containment, and a human machine interface 154.

Flywheel and Motor-Generator Description

Figure 2:
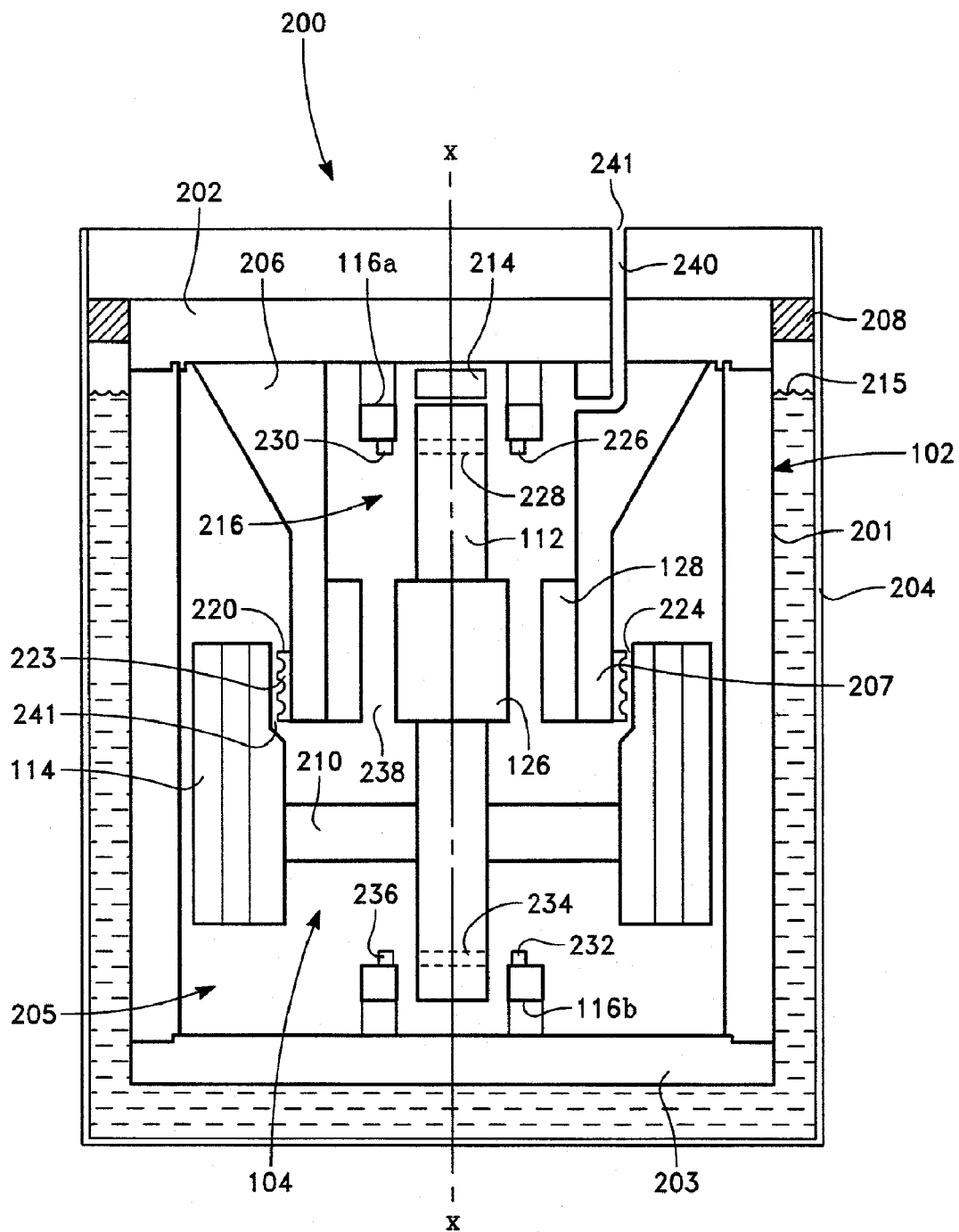
FIG. 2 is a schematic diagram showing a cross-section of a preferred flywheel and motor-generator of the flywheel power supply of FIG. 1A.

FIG. 2 shows an exemplary schematic cross-section of a flywheel and an associated motor-generator 200 in accordance with the present invention. An evacuated containment 102 includes a circumferential wall 201 about a substantially vertical axis x-x and upper and lower support plates 202, 203. In various embodiments, the support plates may be one or more of plate material, cast material, machined material or another suitable fabrication. Substantially bounding a flywheel chamber 205 is the circumferential wall and the upper and lower support plates.

In an embodiment, the circumferential wall and the lower support plate are a single integrated structure. The support plates may be substantially flat, curved or otherwise formed to provide needed support to stationary 106 and/or rotating parts 104 of the flywheel system 100. In some embodiments, an outer containment 204 envelops the evacuated containment. And, in some such embodiments, a liquid 215 filling at least a portion of the annular space between the circumferential wall and the outer containment damps relative motion between these parts; for example, in the event of a bearing failure causing rotating parts to transfer torque to the inner containment.

Within the evacuated container 102, a flywheel shaft 112 carries a motor-generator rotor 126 and a flywheel mass 114. The flywheel mass is constrained to rotate with the shaft. In an embodiment, the flywheel mass is coupled to the shaft via a hub 210. At least one electromagnetic bearing is operative to support the flywheel mass. In an embodiment, electromagnetic bearings 116*a-b* are operative to support the shaft.

As used in this patent specification, the term coupled means directly or indirectly connected. And, as persons of ordinary skill in the art will understand, some flywheels have integral shafts and/or bearing interfaces and, among these, some will not have a shaft that is distinguishable from the flywheel mass; for example, in some embodiments bearing interfaces with the flywheel mass itself provide flywheel mass support.

In an embodiment, a first magnetic bearing providing radial support 116*a* is located near the upper end of the shaft and a second magnetic bearing providing radial support 116*b* is located near the lower end of the shaft. In various embodiments, the bearings are supported by one or more of the support plates 202, 203 and the circumferential sidewall 201.

In some embodiments a third magnetic bearing providing axial support 214 is located near the upper end of the shaft. In various embodiments, selected bearings are either permanent magnet or electro-magnetic bearings. And in some embodiments, the upper axial bearing includes a permanent magnet and an electromagnetic bearing.

Electromagnetic bearings may be used in conjunction with other types of bearings. For example, in an embodiment upper and lower radial bearings 116*a-b* are electromagnetic bearings and an upper axial bearing 214 includes both an electromagnetic and a permanent magnet bearing. Here, the upper radial bearing and upper axial bearing are supported by the upper support plate 202 and the lower radial bearing is supported by the lower support plate 203.

A motor-generator stator 128 is supported by the upper support plate 202. In an embodiment, the stator is at least partially encircled by a stator housing 206 which is in turn coupled to the upper support plate. In an embodiment, an annular flywheel 114 encircles a lower portion of the flywheel housing 207 such that a substantially annular rotor chamber 216 is formed. Here, the rotor chamber is substantially bounded by portions of the stator 128, stator housing 206, upper support plate 202, flywheel 114, hub 210, shaft 112 and motor-generator rotor 126.

In some embodiments the rotor is therefore enveloped by a first chamber that is partially enveloped by a stator support structure including a stator housing. And in some embodiments, this first chamber is substantially enveloped by a flywheel or second chamber.

Because the state of a flywheel power supply is characterized, at least in part, by the rotational speed of a flywheel mass, speed is typically a control system input. In an embodiment, shaft speed provides feedback for flywheel power supply control. Any suitable speed sensor such as mechanical, electromechanical, magnetic and optical sensors may be used. In an embodiment an optical speed sensor is used (as shown). Here, a light emitter 226 is in opposed relationship to a light sensor 230 with the shaft 112 therebetween. A hole in the shaft 228 provides an optical path between the sensor and the emitter two times for each revolution of the shaft. This provides a 2× shaft speed signal. In some embodiments, a backup light emitter, shaft hole and light sensor are provided 232, 234, 236.

Support Systems, Vacuum System

Flywheel component drag is reduced by operation one or more of the flywheel power supply's rotating parts 104 within an evacuated environment. Such an environment is created and/or maintained by removing unwanted gasses. For example, one or more of a conventional vacuum pump, molecular drag pump and getters may be used.

In an embodiment, within the flywheel chamber 205 is a molecular drag pump for evacuating the flywheel chamber. Here, gasses being evacuated from the flywheel chamber pass through a first gap 241 between the flywheel 114 and the stator housing 206, pass through a second gap 238 between the stator 128 and the rotor 126, and are subsequently removed from the rotor chamber 216. In some embodiments the gasses being evacuated travel through a conduit in fluid communication with the rotor chamber. In one example, the evacuation conduit 240 passes through the stator housing, the upper support and the outer containment, where a conduit connection interface 241 is provided.

Molecular drag pumps are formed by, among other things, adjacent parts that experience relative motion. In various embodiments, relative motion between a groove and a nearby surface creates the pumping action. In an embodiment, a molecular drag pump is formed between a flywheel inner surface 224 and a spiral-like groove surrounding a peripheral portion of the stator housing 223. In some embodiments the groove is formed in the stator housing or flywheel and in some embodiments the peripheral groove is formed in a removable ring 220 fixed to the stator housing (as shown) or flywheel. Here, gasses are evacuated from the flywheel chamber 205 via the rotor chamber 216 substantially due to pumping occurring when there is suitable relative motion between the flywheel inner surface and the spiral grooves. In various embodiments, groove pitch varies between greater than 0 degrees and less than 90 degrees.

Six Phase Motor-Generator Embodiment

A motor-generator includes electrical conductors associated with a stationary part referred to as a stator. In various embodiments, the conductors are arranged into one or more phases. In some embodiments, the motor-generator 122 of the present invention utilizes polyphase stator windings. For example, a plurality of stator windings may be used to form a polyphase stator such as a three or six phase stator. A dual three phase motor-generator stator example follows.

Figure 3A:
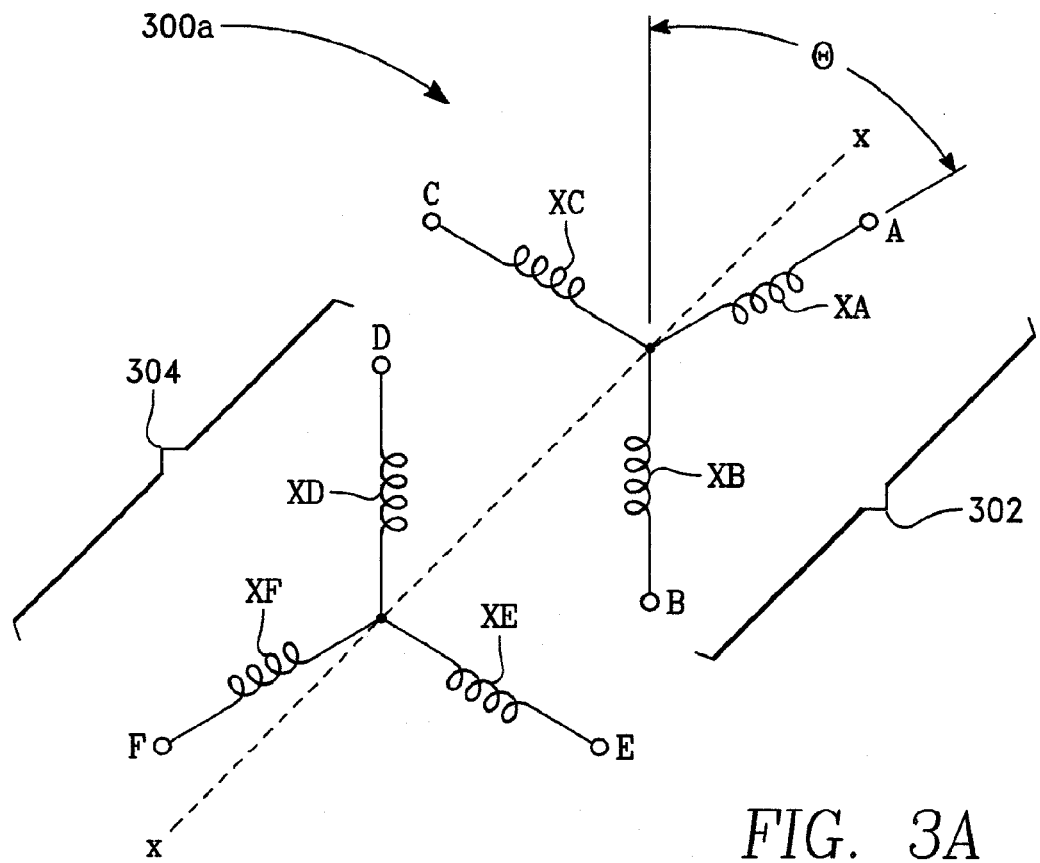
FIG. 3A is a schematic diagram of a six phase stator of the flywheel power supply of FIG. 1A.

FIG. 3A shows a six phase stator embodiment where two three-phase motor-generators are formed 300*a*. In particular, a single rotor with an axis of rotation along axis x-x is part of a first three phase machine with phases A, B and C 302 and part of a second three phase machine with phases D, E and F 304.

In the first machine, Coils XA, XB and XC are Wye connected and in the second machine coils XD, XE and XF are Wye connected. Each of phases A, B, and C are evenly spaced around the stator and each of the phases D, E and F are evenly spaced around the stator. Further, each of phases A, B and C are rotated thirty (30) degrees from each of phases D, E and F respectively such that one machine is thirty (30) degrees out of phase with the other machine. In various embodiments, each of coils XA-C and XD-E can be subdivided and/or replaced by multiple coils in series and/or in parallel.

Figure 3B:
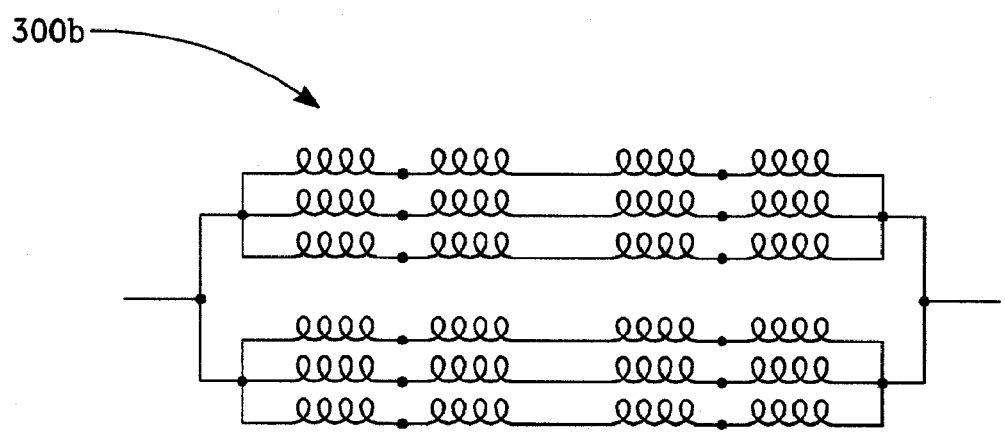
FIG. 3B is a schematic diagram of a coil configuration for use with a stator of the flywheel power supply of FIG. 1A.

In an embodiment, each of the stator coils XA-C and XD-E of FIG. 3A is replaced with a series-parallel coil configuration. In particular, the coil configuration 300b of FIG. 3B replaces each of the single coils shown in FIG. 3A. Using this coil configuration, a six phase, four pole, single layer machine is formed where: a) each phase consists of two paralleled windings; b) each winding consists of three coil sets in parallel and occupying the same slot; and c) each coil set has four coils wound continuously, with a crossover between the first two coils and the other two coils.

As persons of ordinary skill in the art will understand, these and other coil configurations may be used to construct a motor-generator stator and in particular a six phase motor-generator stator. Other examples include the stators disclosed by Khutorestsky et al. and Lipo et al. in U.S. Pat. Nos. 4,132,914 and 6,710,495. These patents are incorporated herein by reference.

Power Electronics and Controls

Figure 4:
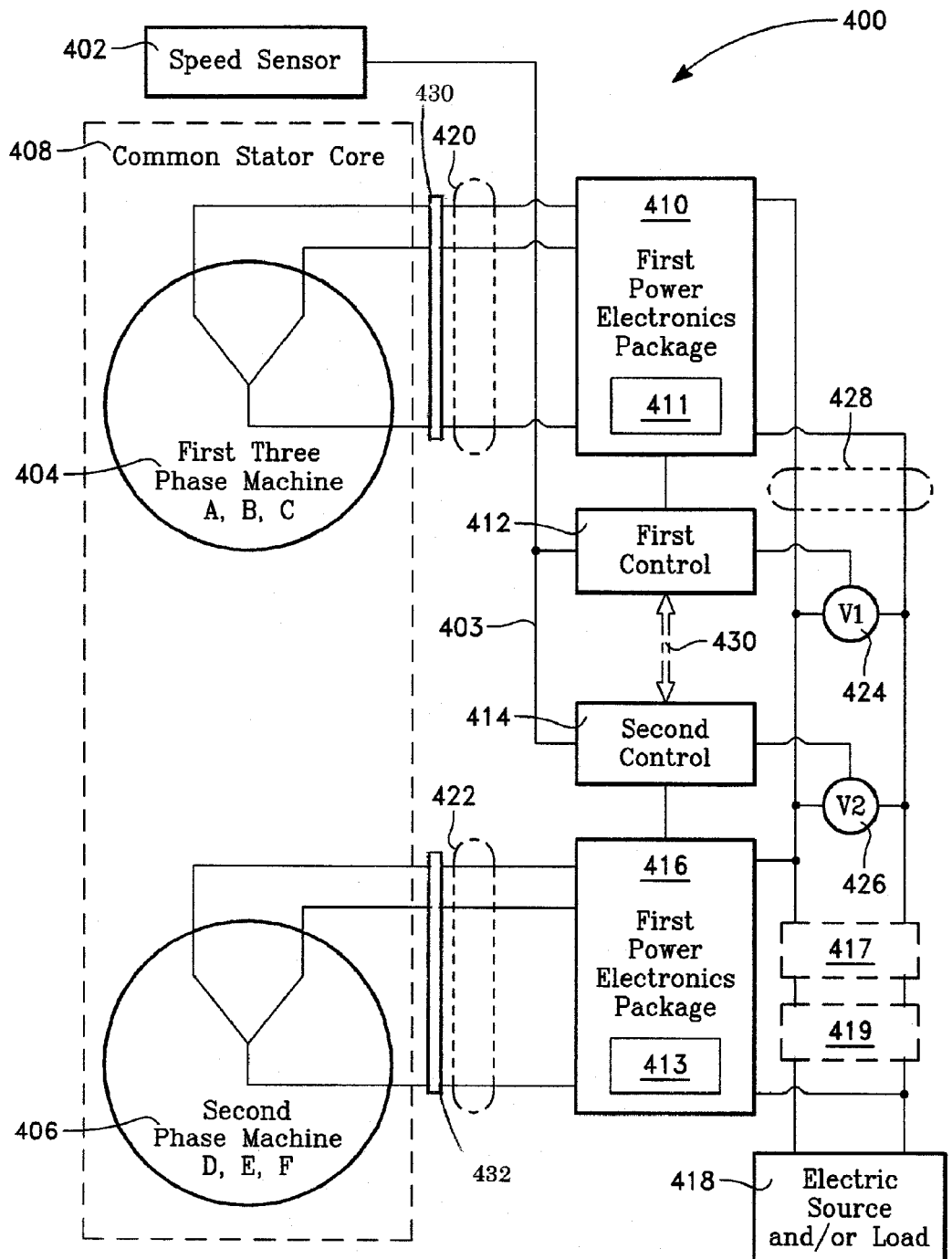
FIGS. 4-5 are schematic diagrams of power electronics and controls of an embodiment of the flywheel power supply of FIG. 1A.

FIG. 4 shows the power electronics and controls of an embodiment of the flywheel power supply 400. A first three phase machine 404 and a second three phase machine 406 utilize a common stator core 408. As shown in this example, the power exchanged with the first three phase machine 420 is processed by a first power electronics package 410 and the power exchanged with the second three phase machine 422 is processed by a second power electronics package 416.

In an embodiment, each power electronics package 410, 416 includes an AC to DC power converter 411, 413 coupling respective three phase machines 404, 406 with a bus 428 that is coupled to an electric source and/or load 418. As will be understood by a person of ordinary skill in the art, bidirectional power converters are utilized where power is both delivered to and sourced from an electric source and load 418.

In various embodiments, the electrical source and load 418 indicates one or more electrical sources, one or more electrical loads, and combinations of sources and loads such as an electrical network receiving electric power from the grid. In some embodiments, the flywheel power supply 100 delivers backup power to a load on an electrical network interconnected with the flywheel power supply.

In another embodiment, each power electronics package 410, 416 includes respective AC to DC power converters coupling each three phase machine 404, 406 with a bus and a DC to DC 417 power converter coupling the bus to an electric source and/or load 418. In yet another embodiment, the power electronics package includes two AC to DC power converters coupling respective three phase machines with a bus and a DC to AC power converter 419 coupling the bus to an electric source and/or load 418. In various embodiments, the bus and/or the DC to AC converters are included within the power electronics packages.

In an embodiment, the two power electronics packages operate independently, without supervisory control. Here, each of a first power electronics controller of the first power electronics package 412 and a second power electronics controller of the second power electronics package 414 receive a common feedback signal 403 from a speed sensor 402 from which the speed of the flywheel shaft 112 can be derived. As discussed above, some embodiments use one or more optical speed sensors (see 226, 228, 230 and 232, 234, 236).

In various embodiments, a bus 428 couples the power electronics package to an electric source and/or load. Bus voltage V1 indicated by a first voltage transducer 424 is provided to the first power electronics package 410. In some embodiments, a second bus voltage V2 is measured by a second voltage transducer 426 and is provided to the second power electronics package.

In an embodiment, bus voltage measurement errors that might otherwise cause unequal sharing of power provided to a load 418 is resolved by utilizing an average voltage. Each controller 412, 414 utilizes a communications link 430 between the controllers to acquire the other controllers measured voltage. Once the voltage is acquired, the controllers calculate an average bus voltage (V1+V2)/2 which becomes the bus control voltage. Using the same bus control voltage minimizes or eliminates unequal load sharing problems associated with voltage measurement errors.

Figure 5:
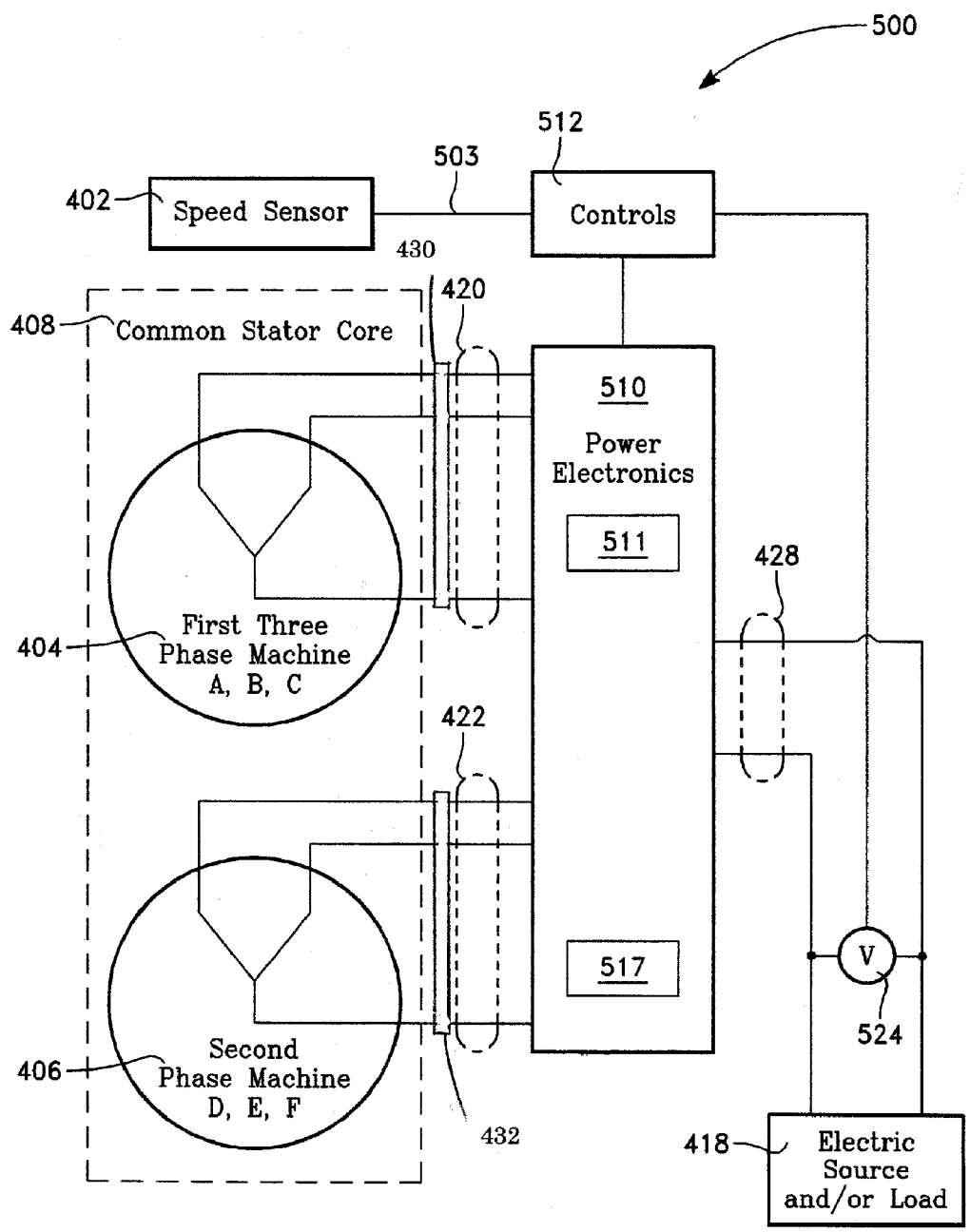

FIG. 5 shows the power electronics and controls of another embodiment of the flywheel power supply 500. Here, a single power electronics controller 512 is utilized. A first three phase machine 404 and a second three phase machine 406 utilize a common stator core 408. As shown in this example, the power exchanged with the first three phase machine 420 and the second three phase machine 422 is processed by a power electronics package 510 controlled by a single controller 512.

In an embodiment, the power electronics package 510 includes respective AC to DC power converters 511, 517 coupling each three phase machine with a bus 428 coupled with an electric source and/or load 418. In another embodiment, the power electronics package 510 includes respective AC to DC power converters coupling each three phase machine with a bus 428 and a DC to DC power converter 417 coupling the bus with an electric source and/or load 418. In yet another embodiment, the power electronics package 510 includes respective AC to DC power converters coupling each three phase machine with a bus 428 and a DC to AC power converter 419 coupling the bus with an electric source and/or load 418. In various embodiments, the bus and/or the DC to AC converter is included within the power electronics packages.

As will be understood by a person of ordinary skill in the art, bi-directional power converters are utilized where power is both delivered to and sourced from an electric source and load 418. The power exchanged between the three phase machines 404, 406 and the electric source and/or load 418 is controlled by the flywheel controls 512. The controls receive a feedback signal 503 from a speed sensor indicating motor-generator shaft speed and a voltage sensor indicating the voltage supplied to the load 524. As discussed above, some embodiments use one or more optical speed sensors (see 226, 228, 230 and 232, 234, 236).

In operation, the flywheel mass 114 spins in an evacuated containment 102 and bi-directionally exchanges mechanical energy with the motor-generator 122. Power electronics 124 interconnecting the motor-generator and an electric source and load 109 enables the transfer of electric power to and from the motor-generator which in turn accelerates or decelerates the of the flywheel mass 114. In a typical application, the flywheel power supply provides backup power for loads to be supported in the event of a loss of utility or other sources of electric power.

In an embodiment, the energy conversion system incorporates a low loss AC motor-generator 122 including a stator 128 for providing a rotating magnetic "wave" that is applied to a rotor of the motor-generator 126. Here, various embodiments of the motor-generator are designed to approximate an ideal wave that is purely sinusoidal both spatially and temporally in the stationary frame so that it appears constant in time in the rotating reference frame associated with the rotor. Because waves tending toward this ideal increasingly cause the rotor to "see" a DC field, rotor losses associated with AC fields are reduced.

In AC generators, including the low loss embodiment of the motor-generator above 122, the wave produced by the stator contains additional higher spatial harmonic frequencies that are time-varying in the rotor reference frame and hence induce currents and therefore losses in the rotor. These harmonics can be grouped into three different types associated with their source: current, slot and winding harmonics.

Current harmonics exist where stator currents are not exactly sinusoidal. Locating a suitable LC filter 430, 432 in respective circuits between the stator 404, 406 and the converter 510 removes unwanted high-frequency harmonics in the currents resulting from semiconductor switching such as the pulse-width modulation switching associated with many converters. Passive and active devices known to persons of ordinary skill in the art may be used to implement such LC filters.

Slot harmonics result from the slotted nature of the stator iron and thus occur at multiples of rotor frequency multiplied by the number of slots. Because higher slot counts have been shown to reduce rotor losses, in various embodiments, the stator 128, 409 of the motor-generator 122 utilizes more than the minimum number of stator slots such as 48 or 96 slots in a four-pole, six-phase machine.

In an ideal generator, the concentration of windings for a given phase varies sinusoidally with the circumference of the stator. Difficult to achieve in practice, such winding variances can be approximated by fractional-pitch winding schemes. Similar benefits result from additional motor-generator phases.

Additional motor-generator phases and the currents and current phase angles associated with them result in benefits similar to increasing the resolution of the stator winding structure and the stator's ability to generate a sinusoidal magnetomotive force. For example, a six-phase motor-generator can be expected to have smaller winding harmonics than an otherwise comparable three-phase machine.

While various embodiments of the present invention have been described above, it should be understood that they have been presented by way of example only, and not limitation. It will be apparent to those skilled in the art that various changes in the form and details can be made without departing from the spirit and scope of the invention. As such, the breadth and scope of the present invention should not be limited by the above-described exemplary embodiments, but should be defined only in accordance with the following claims and equivalents thereof.

What is claimed is:

1. A flywheel power supply comprising:
    a synchronous reluctance motor-generator including a rotor and a stator;
    a flywheel mass located within an evacuated containment;
    the flywheel mass coupled to and constrained to rotate in synchrony with the rotor;
    the flywheel mass bi-directionally exchanging mechanical power with the motor-generator;
    a plurality of windings on the stator forming six electrical phases A, B, C, D, E and F;
    one or more stator windings bi-directionally exchanging electric power with one or more AC to DC converters; and,
    one of the AC to DC converters coupled to an electrical network for providing backup power to the electrical network.

2. The flywheel power supply of claim 1 further comprising:
    a first three phase motor-generator including the rotor and windings of three of the electrical phases A-C of the stator;
    a second three phase motor-generator including the rotor and windings of three of the electrical phases D-F of the stator;
    the first three phase motor-generator bi-directionally exchanging electric power with a first AC to DC converter; and,
    the second three phase motor-generator bi-directionally exchanging electric power with a second AC to DC converter.

3. The flywheel power supply of claim 2 wherein the flywheel rotates about a substantially vertical axis.

4. The flywheel power supply of claim 3 further comprising a stator support structure from which the stator is hung.

5. The flywheel power supply of claim 4 further comprising a first chamber partially enveloped by the stator support structure and enveloping the rotor.

6. The flywheel power supply of claim 5 further comprising a second chamber enveloping the flywheel mass and substantially enveloping the first chamber.

7. The flywheel power supply of claim 6 further comprising a vacuum pump operable to transfer gas from the second chamber to the first chamber.

8. The flywheel power supply of claim 1 further comprising:
    a first three phase motor-generator including the rotor and windings of three of the electrical phases A-C of the stator;
    a second three phase motor-generator including the rotor and windings of three of the electrical phases D-F of the stator;
    a first power electronics package exchanging power with electrical phases A-C of the stator;
    a second power electronics package exchanging power with electrical phases D-F of the stator; and,
    at least one of the power electronics packages bi-directionally exchanging power with an electrical network and providing back-up power to one or more loads on the network.

9. The flywheel power supply of claim 8 further comprising:
    independent first and second power electronics controllers controlling first and second AC to DC converters;
    DC connections of each of the first and second AC to DC converters interconnected by a DC bus;
    first and second independent voltage indicating devices providing first and second indications of DC bus voltage $V1$, $V2$; and,
    first and second power electronics controllers utilizing an average of the indicated bus voltages $((V1+V2)/2)$ for controlling respective AC to DC converters.

* * * * *